(12) United States Patent
Steffens et al.

(10) Patent No.: US 7,481,128 B2
(45) Date of Patent: Jan. 27, 2009

(54) GEARSHIFT UNIT FOR A TRANSMISSION OF A MOTOR VEHICLE

(75) Inventors: Frank Steffens, Ostfildern (DE); Martin Teutschländer, Steinenbronn (DE)

(73) Assignee: Daimler A.G., Stuttgart (DE)

( * ) Notice: Subject to any disclaimer, the term of this patent is extended or adjusted under 35 U.S.C. 154(b) by 389 days.

(21) Appl. No.: 11/497,062

(22) Filed: Aug. 1, 2006

(65) Prior Publication Data

US 2007/0032343 A1 Feb. 8, 2007

(30) Foreign Application Priority Data

Aug. 5, 2005 (DE) .................. 10 2005 036 940

(51) Int. Cl.
*F16H 59/00* (2006.01)
(52) U.S. Cl. ........................................ 74/335
(58) Field of Classification Search .................. 74/335; 477/34
See application file for complete search history.

(56) References Cited

U.S. PATENT DOCUMENTS

| 4,570,502 A | * | 2/1986 | Klatt ........................... 74/335 |
| 4,742,724 A | * | 5/1988 | Jimbo et al. ............... 74/388 R |
| 5,033,324 A | * | 7/1991 | Glaser ...................... 74/473.19 |
| 5,094,079 A | * | 3/1992 | Leigh-Monstevens et al. . 60/545 |

FOREIGN PATENT DOCUMENTS

| DE | 199 00 820 | 9/1999 |
| DE | 198 39 854 | 3/2000 |
| DE | 100 29 497 | 1/2002 |
| DE | 103 39 151 | 3/2005 |
| JP | 2006-112442 | * 4/2008 |

* cited by examiner

*Primary Examiner*—Ha D. Ho
(74) *Attorney, Agent, or Firm*—Klaus J. Bach

(57) ABSTRACT

In a gearshift unit for a transmission of a motor vehicle, wherein a driver of the motor vehicle shift the gears of the transmission by means of a gearshift lever and the gearshift unit has a gearshift power-assist unit to enhance the shift force exerted by the driver of the vehicle, a control device is provided which detects a significant increase in a moment of inertia, in excess of a normal amount, of masses to be accelerated in the event of a gearshift in the transmission and actuates the gearshift power assist unit to assist the shift forces only when no significant increase in the moment of inertia has been detected in order to prevent high shifting forces from being generated when they might lead to damage to the transmission.

2 Claims, 1 Drawing Sheet

GEARSHIFT UNIT FOR A TRANSMISSION OF A MOTOR VEHICLE

BACKGROUND OF THE INVENTION

1. Field of the Invention

The invention relates to a gearshift unit for a transmission of a motor vehicle including a shift lever for shifting the gears of the transmission, a gear shift assist unit for assisting the shift movement of the shift lever and a control device for controlling the operation of the gear shift assist unit.

2. Description of the Prior Art

DE 198 39 854 A1 discloses a gearshift unit for a transmission of a motor vehicle. Transmissions can be shifted by a driver of a motor vehicle by means of a gearshift lever. In order to reduce the shift force that has to be exerted by the driver of the vehicle, the gearshift unit has a pneumatic gearshift servo-assist unit, which is fed by a compressed air system of the motor vehicle. The gearshift servo-assist unit is capable of exerting an additional shift force, which supplements the shift force which the driver exerts via the gearshift lever. The gearshift unit is designed so that the additional shift force is exerted only when a drive connection between a power unit and the transmission is interrupted by means of a clutch. In addition a control device of the gearshift unit actuates an electro-magnetic valve of the gearshift servo-assist unit so that the additional shift force only acts when, in the desired gear, the engine speed does not exceed an engine speed limit.

It is the object of the present invention is to provide a power gearshift unit which safely prevents damage to the transmission by undesirable shifting actions.

SUMMARY OF THE INVENTION

In a gearshift unit for a transmission of a motor vehicle, wherein a driver of the motor vehicle shift the gears of the transmission by means of a gearshift lever and the gearshift unit has a gearshift power-assist unit to enhance the shift force exerted by the driver of the vehicle, a control device is provided which detects a significant increase in a moment of inertia, in excess of a normal amount, of masses to be accelerated in the event of a gearshift in the transmission and actuates the gearshift power assist unit to assist the shift forces only when no significant increase in the moment of inertia has been detected in order to prevent high shifting forces from being generated when they might lead to damage to the transmission.

When changing gears in a gearbox of a countershaft type transmission, the countershaft, the transmission input shaft and the loose gear assigned to the target gear must be accelerated to the synchronous speed of the target gear. When shifting down this acceleration is equivalent to an increase in the number of revolutions and when shifting up to a reduction in the number of revolutions. The control device is capable, in particular, of detecting whether additional gears and/or shafts are directly or indirectly connected to the transmission input shaft, thereby significantly increasing the moment of inertia. In the normal state the moment of inertia of the masses to be accelerated is no greater than the moment of inertia for which the transmission components are designed. That is, then, no additional gears and/or shafts are connected to the transmission input shaft.

Gearshifts are performed by the gearshift unit according to the invention only when the drive connection between the power unit of the motor vehicle and the transmission is interrupted by means of a clutch. The clutch can be operated by the driver of the vehicle by means of a clutch pedal, or the clutch may be a semi-automatic clutch.

The necessary shift force for synchronization is approximately proportional to the moment of inertia of the masses to be accelerated. Should the moment of inertia increase sharply, a significantly greater shift force is necessary. In a so-called synchromesh transmission, that is to say a transmission with synchromesh devices for each gear, the shift force for the synchronization is transmitted to the countershaft by way of the synchromesh. If excessive shift forces are exerted this can result in damage to the synchromesh in the form of heavy wear or failure of the synchromesh. The synchromesh devices are usually designed so that the shift force exerted by the driver of the vehicle via the gearshift lever cannot lead to any damage. If the additional shift force of the gearshift servo-assist unit acts in addition to the shift force exerted by the driver of the vehicle, however, an excessive force may be exerted.

The control device is therefore intended to actuate the gearshift servo-assist unit to assist the shift force only when no significant increase in the moment of inertia has been detected.

This ensures that the shift force exerted does not become so great that it can result in damage to the transmission. The driver of the vehicle can still perform a gearshift by means of the gearshift lever, but to do this he must exert a greater shift force than for a gearshift in the normal state of the transmission. He thereby also receives a feedback indicating that in the instantaneous state of the transmission only gearshifts that are urgently necessary should be performed.

In a particular embodiment of the invention, the transmission has an auxiliary drive connected at least indirectly to a transmission input shaft. The auxiliary drive may be drive connected directly to the transmission input shaft or connected indirectly via a further shaft, such as a countershaft, to the transmission input shaft. The auxiliary drive serves to bring an auxiliary unit into a driving connection with the transmission. The auxiliary unit may take the form, for example, of a water, slush or hydraulic pump, cable winch, crane superstructure or road sweeper. The auxiliary unit may be coupled to the transmission countershaft, for example, by a dog clutch. The direct or indirect coupling of the auxiliary unit to the transmission input shaft means that the moving parts of the auxiliary unit also have to be accelerated in the event of a gearshift. With the auxiliary unit connected, the moment of inertia of the masses to be accelerated thereby increases significantly compared to the normal state without the auxiliary unit connected.

The control device is designed so that it can detect whether an auxiliary unit is connected to the auxiliary drive. This can be achieved, for example, in that the coupling is actuated by the control device, so that the control device thereby detects the state of the auxiliary drive. It is likewise possible to arrange a sensor, such as a travel sensor, or a switch on the auxiliary drive, which can serve to detect whether an auxiliary unit is connected. For example, it is possible to detect the position of a dog clutch on the auxiliary drive.

The control device is intended to actuate the gearshift servo-assist unit in order to increase the shift force only when no auxiliary unit is connected to the auxiliary drive. Detecting whether an auxiliary unit is connected to the auxiliary drive is a reliable and easy method of detecting an increase in the moment of inertia. Any damage to the transmission is thereby reliably and easily prevented.

The transmission may also have a shifter lock which prevents the engagement of a gear when an auxiliary unit is connected. Should the additional shift force of the gearshift servo-assist unit be exerted despite an auxiliary unit being connected, this could result in serious wear or failure (fracture) of the shifter lock.

Further advantages of the invention will become apparent from the following description of exemplary embodiments of the invention with reference to the accompanying drawing.

DETAILED DESCRIPTION OF THE PREFERRED EMBODIMENTS

Figure 1:
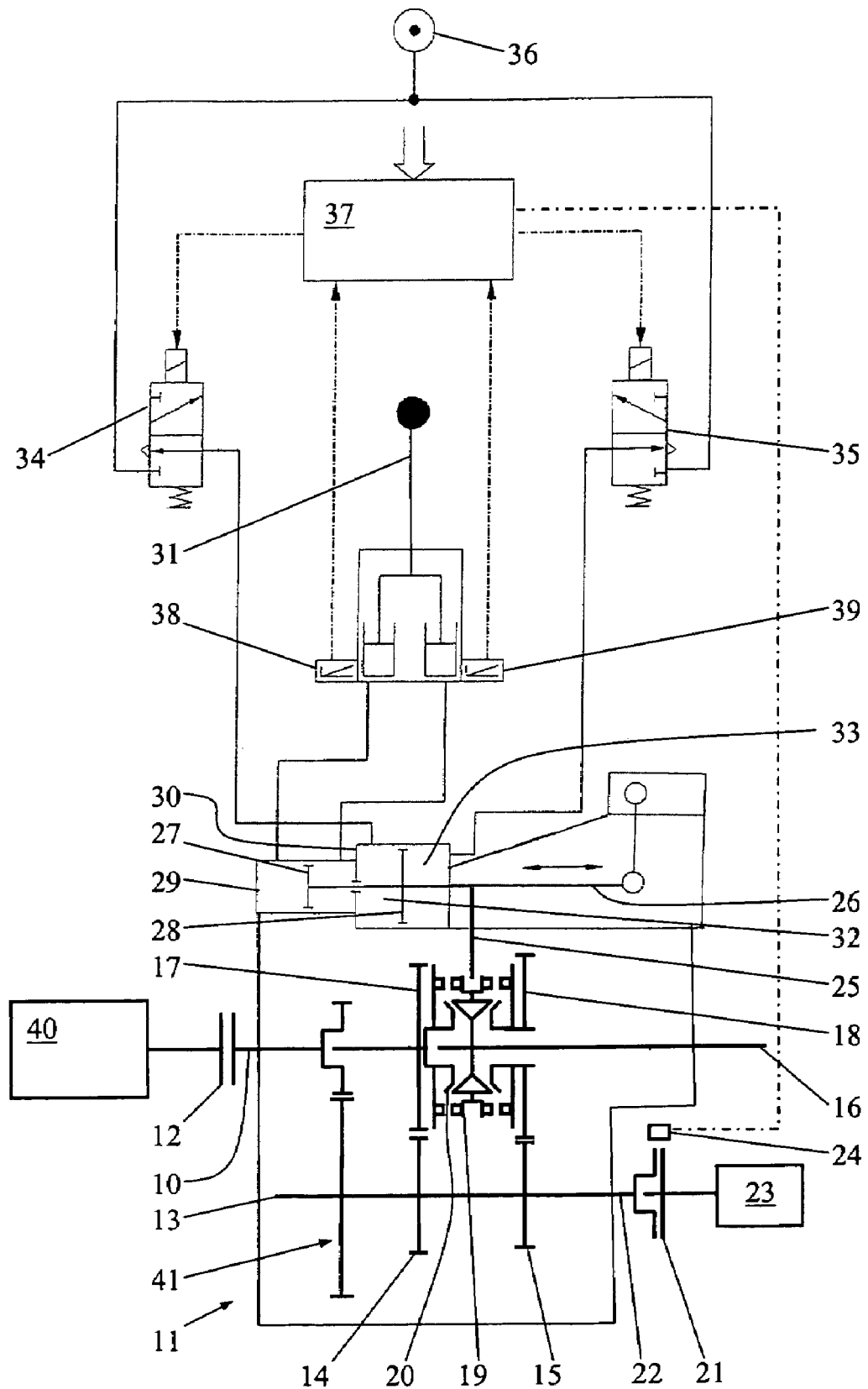
FIG. 1 shows a manually shifted synchromesh transmission having a pneumatic gearshift servo-assist unit and an auxiliary unit connected to the transmission.

According to FIG. 1 a transmission input shaft 10 of a manually shifted synchromesh transmission 11 is connected by means of a clutch 12 to a power unit 40 in the form of an internal combustion engine. The clutch 12 can be operated by a driver of the vehicle by means of a clutch pedal (not shown). The transmission 11 takes the form of a gearbox of countershaft type. The transmission 11 has a countershaft 13, which is arranged parallel to the transmission input shaft 10 and which is connected by way of a gear stage 41 to the transmission input shaft 10. Two fixed gears 14, 15 for the two gears of the transmission 11, represented by way of example, are arranged, rotationally locked, on the countershaft 13. One end of the countershaft 16 remote from the power unit 40 takes the form of an auxiliary drive 22. An auxiliary unit 23 can be connected to the auxiliary drive 22 via a dog clutch 21, which can be operated by the driver of the vehicle. A sensor 24, which can detect whether the dog clutch 21 is closed, that is to say whether or not an auxiliary unit is connected, is arranged on the dog clutch 21.

A transmission output shaft 16, on which two loose gears 17, 18 are rotatably arranged, which mesh with the fixed gears 14, 15, is arranged coaxially with the transmission input shaft 10. Either of the loose gears 17, 18 can be rotationally locked to the transmission output shaft 16 by means of a slide coupling 19. The slide coupling 19 has a synchromesh device 20, by means of which the loose gear 17, 18 to be connected, the countershaft 16 and the transmission input shaft 10, can be accelerated or braked to the synchronous speed of the target gear. Should excessive shift forces be exerted in this process, this can lead to a very high degree of wear or to a failure of the synchromesh.

The slide coupling 19 can be shifted parallel to the transmission output shaft 16 by a gearshift rod 26 by way of a gearshift fork 25. The gearshift rod 26 is connected to two pistons 27, 28 of two piston-cylinder units 29, 30. The piston cylinder unit 29 is hydraulically operated, a corresponding actuation of a gearshift lever 31 causing hydraulic oil to act on either of the two faces of the piston 27. The gearshift lever 31 is therefore capable of exerting a force on the piston 27 in both directions of movement of the piston 27. This shift force exerted by the driver of the vehicle serves to displace the gearshift rod 26 and hence the slide coupling 19.

A force can also be exerted on both faces of the piston 28 to assist the shift force applied by the driver of the vehicle. For this purpose pressure chambers 32, 33 of the piston-cylinder unit 30 can be connected by way of solenoid valves 34, 35 to a compressed air system 36 of the motor vehicle, one of the pressure chambers 32, 33 being arranged on either side of the piston 29. The solenoid valves 34, 35 are actuated by a control device 37. The control device 37 only ever actuates one of the solenoid valves 34, 35, in order to thereby exert a force on one of the faces of the piston 28. This additional shift force acts likewise on the gearshift rod 26 and hence on the slide coupling 19. In order to determine which of the solenoid valves 34, 35 needs to be actuated, two sensors 38, 39 are arranged on the gearshift lever 31. The sensors 38 and 39 serve to detect in which direction the gearshift lever 31 is moved, that is to say in which direction the shift force exerted by the driver of the vehicle is acting. On the basis of this information the control device 37 actuates that solenoid valve 34 or 35 which produces a force in the same direction.

The control device 37 is also in signal contact with the sensor 24, which serves to detect whether an auxiliary unit is connected to the auxiliary drive 22. The solenoid valves 34, 35 are actuated and an additional shift force is thereby exerted only when it is determined by the sensor 24 that the dog clutch 21 is opened and hence no auxiliary unit is connected to the auxiliary drive 22. If the dog clutch 21 is closed, meaning that an auxiliary unit is connected, a gearshift can nevertheless be performed, but in this case only the shift force exerted by the driver of the vehicle via the gearshift lever 31 and the piston 27 will be applied.

As a further precondition for the actuation of the solenoid valves 34, 35, the clutch 12 must be opened, meaning that the drive connection between the transmission input shaft 10 and the power unit 40 is interrupted. The control device 37 can detect this by means of a sensor (not shown) on the clutch 12.

The gearshift unit according to the invention can also be used in connection with a power-assisted gearshift having so-called path control. Only one solenoid valve is then needed for this purpose. Sensors on the gearshift lever are not necessary in this embodiment. The solenoid valve may be actuated by an existing control device in the motor vehicle.

What is claimed is:

1. A gearshift unit for a transmission of a motor vehicle, with an auxiliary unit (23), the gear shift unit including:
    a gearshift lever (31), by which a driver of the motor vehicle can perform gearshifts in the transmission (11)
    a gearshift power-assist unit (28, 30, 34, 35), which is capable of exerting an additional shift force
    and
    a control device (37), which is capable of detecting an operation of the gearshift lever (31) and, depending thereon, can activate the gearshift power-assist unit (28, 30, 34, 35),
    the control device (37) being capable of actuating the gearshift power-assist unit (28, 30, 34, 35) when the gearshift lever (31) is operated to perform a gearshift, so that the additional shift force assists a shift force exerted by the driver of the vehicle,
    the control device (37) including
    means for detecting a significant increase in a moment of inertia, in excess of a normal amount required for an acceleration of masses during the shifting of a gear in the transmission (11) with a drive connection to a power unit (40) being interrupted and
    for activating the gearshift power-assist unit (28, 30, 34, 35) to assist the shift force only when no significant increase has been detected.

2. The gearshift unit as claimed in claim 1, wherein
    the transmission (11) has an auxiliary drive (22), which is connected at least indirectly to a transmission input shaft (10) and which serves to bring the auxiliary unit (23) into a drive connection with the transmission (11),
    the control device (37) being capable of detecting whether the auxiliary unit (23) is connected to the auxiliary drive (22) and
    the control device (37) being adapted to actuate the gearshift power-assist unit (28, 30, 34, 35) to assist the shift force only when the auxiliary unit (23) is not connected to the auxiliary drive (22).

* * * * *